(No Model.)
P. S. REID.
SPECTACLES.
No. 363,484. Patented May 24, 1887.
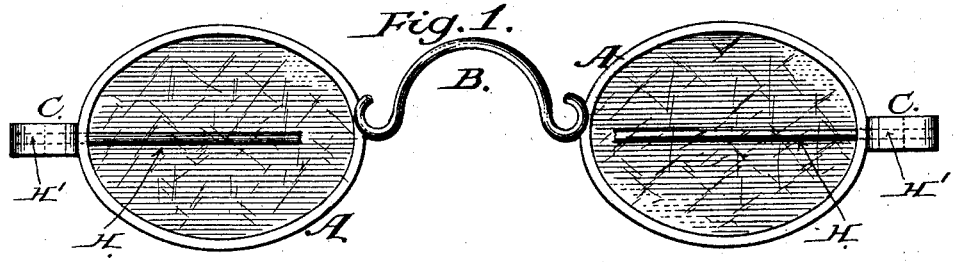
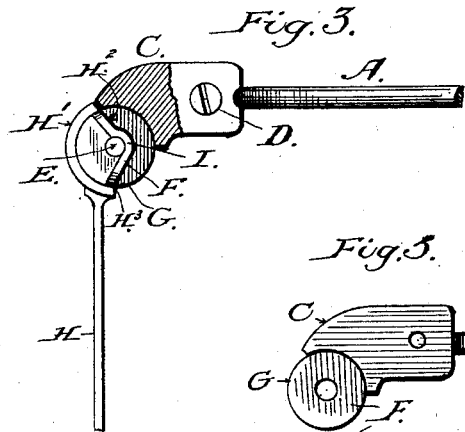
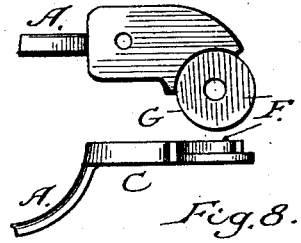
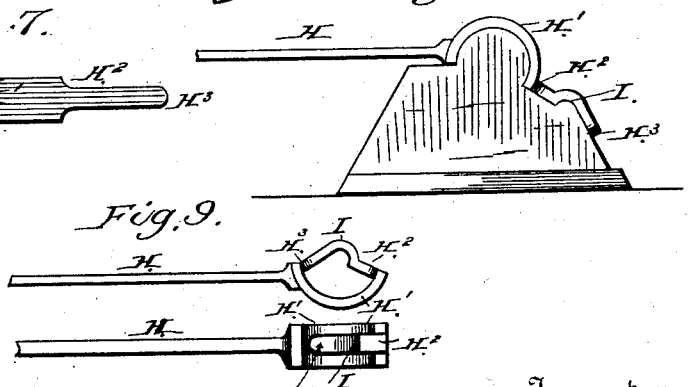
Witnesses
J. W. Fowler
D. S. Clark,
Inventor
Philip S. Reid,
By his Attorney
Thomas P. Kinsey

UNITED STATES PATENT OFFICE.

PHILIP S. REID, OF PHILADELPHIA, PENNSYLVANIA.

SPECTACLES.

SPECIFICATION forming part of Letters Patent No. 363,484, dated May 24, 1887.

Application filed December 11, 1886. Serial No. 221,259. (No model.)

*To all whom it may concern:*

Be it known that I, PHILIP S. REID, a citizen of the United States, residing at the city of Philadelphia, county of Philadelphia, State of Pennsylvania, have invented a new and useful Improvement in Spectacles, of which the following is a specification.

This improvement is more particularly related to the temple-joint of spectacles.

The object of the improvement is to construct a spring-joint that will keep the temple side piece closely in contact with the working periphery of the end pieces, and will impart, by its pressure upon the end-piece pivot or steady-pin, sufficient friction to retain the temples in any position of their movement in which they may be placed, and at the same time will not interfere with the free movement of the same.

In the usual construction of the temple the side pieces, formed to clamp the outer rounded plan of the side-piece blocks, are pierced centrally, and a flat piece having a perforation corresponding with the diameter of the steady-pin and a thickness adapted to fill out the recessed space in the side pieces is punched round, with a tongue integral therewith, to fit said temple perforation. These pieces are subsequently placed in position in the temple and the tongue riveted thereto. This makes an expensive joint and requires considerable skill to execute, and many of the joint-pieces, owing to their minute size, are daily lost.

In my improvement the temple and pivot portions are formed integral with each other, being first punched as a blank, Figure 7, of the requisite shape, and subsequently bent upon dies adapted to give the desired form to the same, as in Fig. 9. This makes a cheap construction; and dies and punches being provided, the work may all be done by boys and girls with a little instruction and supervision.

The accompanying drawings, in which my improvement is shown upon an enlarged scale, will give an expert a full knowledge thereof, similar letters of reference indicating like parts, Fig. 1 representing in full rear elevation a pair of spectacles with my improvement attached, by which it will be seen that to the eye there is no apparent change in the completed form of the same, Fig. 2 representing the same in plan, Fig. 3 showing in plan my improvement, the upper portion of the end piece removed and the temple opened out at right angles with the spectacle eye-frames. Fig. 4 represents the opposite end temple-joint, also uncovered, showing the temple closed against the eye-frame; Fig. 5, a plan and end elevation of the lower portion of an end piece detached from the eye-frame; Fig. 6, a plan and elevation of the upper portion of an end piece detached from the eye-frame; Fig. 7, a punched blank temple, being a portion near the pivot or steady-pin of the end piece. Fig. 8 represents the first process of forming the temple-joint upon a die. Fig. 9 represents the completed form of temple-joint on plan and an elevation of the same as turned over upon its side.

In the drawings, A represents the eye-frames; B, the nose-bow; C, the side or end pieces integral with the eye-frames; D, the securing-screw; E, the pivot or steady-pin for the temple-joint; F, a recess in both upper and lower eye-frame side pieces; G, the peripheral edge of side pieces concentric with the pivot E, all of which correspond in their main features with the general construction of spectacles, and to which I make no claim.

The temples H, constructed as shown very clearly in Figs. 3, 7, and 9, are preferably stamped or punched from steel plate, in the original form of Fig. 7, the widened portion H' forming a partial hoop (when bent to form) for the peripheral edges G of the side pieces, while the spring-tongue portion $H^2$, reduced in width, fits snugly within the side-piece recesses F, and which are subsequently bent to the form shown in Figs. 8 and 9, upon a series of dies adapted to facilitate the operation, the extreme end $H^3$ being left free.

Any desired amount of frictional pressure may be given to the temple-joint by the set given to the part I, which partially surrounds the pivot E, and should the joint at any time become loose, taking out the temple and resetting the spring-tongue will take up the wear, holding the part H' against G with sufficient force to retain the temple in any part of its movement upon the pivot E, thus getting rid of the annoyance connected with the use of spectacles as ordinarily constructed with a joint liable to wear loose, being unprovided with a compensating joint, as in my improvement.

Having shown the construction, advantages, and application of my improvements, I desire to claim as follows:

1. As an improvement in spectacle-frames, the side pieces provided with the usual recesses to receive the temple-joint, and a pivot-pin central thereto, a temple composed of a widened portion clasping the periphery of the side-piece circle, with a narrower spring-tongue portion bent to partially encircle the pivot-pin, and by its spring holding the widened portion in frictional contact with the side piece, as and for the purpose shown and described.

2. As an improvement in spectacle-frames, the combination, essentially, of the following elements: eye-frames, bow, and side or end pieces, the latter recessed for the temple-joint and secured upon the same after insertion by the securing-screws D, the temple formed with a spring clasping pivot-joint having a widened frictional portion, H′, so arranged that when the temple is opened at right angles with the eye-frame the same shall form a stop against the side piece and the temple shall be held in free frictional contact by the spring pivot clasp I, substantially as shown, and for the purpose set forth.

PHILIP S. REID.

Witnesses:
HARRY D. JOHNSON,
HENRY STUEBNER.